(12) United States Patent
Takahashi (10) Patent No.: US 9,398,176 B2
(45) Date of Patent: Jul. 19, 2016

(54) COMPUTER-READABLE STORAGE MEDIUM STORING IMAGE PROCESSING PROGRAM

(75) Inventor: Yusaku Takahashi, Kariya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 236 days.

(21) Appl. No.: 13/493,657

(22) Filed: Jun. 11, 2012

(65) Prior Publication Data

US 2013/0070293 A1 Mar. 21, 2013

(30) Foreign Application Priority Data

Sep. 20, 2011 (JP) ................................. 2011-204203

(51) Int. Cl.
*H04N 1/00* (2006.01)
*H04N 1/04* (2006.01)
*G06F 3/12* (2006.01)

(52) U.S. Cl.
CPC ....... *H04N 1/00225* (2013.01); *H04N 1/00973* (2013.01); *H04N 2201/0081* (2013.01)

(58) Field of Classification Search
CPC ............ H04N 1/0013; H04N 1/00912; H04N 1/3873; H04N 1/00; G06K 15/02
See application file for complete search history.

(56) References Cited

U.S. PATENT DOCUMENTS

| | | | | |
|---|---|---|---|---|
| 5,995,712 A | * | 11/1999 | Doi | ................................. 358/1.2 |
| 7,450,268 B2 | * | 11/2008 | Martinez | ................ B41J 29/393 |
| | | | | 358/1.9 |
| 8,004,728 B2 | * | 8/2011 | Sugiura | .......................... 358/498 |
| 2005/0128535 A1 | * | 6/2005 | Ogino | ........................... 358/486 |
| 2006/0268362 A1 | * | 11/2006 | Bridges et al. | ................ 358/450 |
| 2007/0121008 A1 | * | 5/2007 | Kanoh | ........................... 348/537 |
| 2007/0211296 A1 | * | 9/2007 | Toda | ..................... G06F 3/1205 |
| | | | | 358/1.18 |
| 2007/0211301 A1 | * | 9/2007 | Hayashi | ........................ 358/404 |

(Continued)

FOREIGN PATENT DOCUMENTS

| | | | | | |
|---|---|---|---|---|---|
| JP | | 09204515 A | * | 8/1997 | ................ G06T 1/60 |
| JP | | 2005005946 A | * | 1/2005 | |

(Continued)

OTHER PUBLICATIONS

Iwata, Akira, Image Forming Apparatus and Control, JP 2009163086 A English Machine Language Translation (EMLT).*

(Continued)

*Primary Examiner* — King Poon
*Assistant Examiner* — Daryl Jackson
(74) *Attorney, Agent, or Firm* — Merchant & Gould P.C.

(57) ABSTRACT

A storage medium storing an image processing program executed by a computer of an information processing device, wherein the program permits the computer to function as: a read-data receiving section to receive read data formed by a reading device on the basis of a reading condition; a read-data storage control section to store the received read data in a storage section; a change-command sending section to send, to the reading device, a change command of the reading condition on the basis of a change direction where the change direction is received after the reading has started; and a converting section to convert, on the basis of the reading condition corresponding to the change command, read data stored after reading has started, wherein the receiving section receives read data formed on the basis of the reading condition after the change command has been sent, where the change command is sent.

4 Claims, 7 Drawing Sheets

(56) References Cited

U.S. PATENT DOCUMENTS

| | | |
|---|---|---|
| 2008/0144123 A1 | 6/2008 | Suzuki et al. |
| 2010/0110499 A1* | 5/2010 | Baba .......................... 358/451 |
| 2012/0218597 A1* | 8/2012 | Hashimoto ........ G03G 15/5004 358/1.15 |
| 2013/0077115 A1* | 3/2013 | Ozaki ......................... 358/1.13 |

FOREIGN PATENT DOCUMENTS

| | | |
|---|---|---|
| JP | 2008-148261 A | 6/2008 |
| JP | 2009-163086 A | 7/2009 |
| JP | 2010-181488 A | 8/2010 |

OTHER PUBLICATIONS

Yoshimoto, Hiroshi, Image Forming Device, JP 2010181488 A English Machine Language Translation (EMLT).*

Satou, Tomotoshi, JP 09204515 A, Aug. 1997 Japan.*

JP 2005-005946 A, Hayashi, Hiroshi, Jan. 2005, English Machine Language Translation (EMLT).*

* cited by examiner

| RESOLUTION | COLOR NUMBER | BRIGHTNESS | CONTRAST |
|---|---|---|---|
| 1200×1200dpi | 24BIT COLOR | −100 | −100 |
| 600× 600dpi | 256 LEVELS OF GRAY | ⋮ | ⋮ |
| ⋮ | ⋮ | 0 | 0 |
| 150× 150dpi | GRAY (ERROR DIFFUSION) | ⋮ | ⋮ |
| 100× 100dpi | MONOCHROME | 100 | 100 |

DOCUMENT DATA D

HEADER 54 {
- SCANNER-SIDE CHANGE COUNT — 55
- NEXT-PAGE INFORMATION — 56

READ DATA

COMPUTER-READABLE STORAGE MEDIUM STORING IMAGE PROCESSING PROGRAM

CROSS REFERENCE TO RELATED APPLICATION

The present application claims priority from Japanese Patent Application No. 2011-204203, which was filed on Sep. 20, 2011, the disclosure of which is herein incorporated by reference in its entirety.

BACKGROUND

1. Field of the Invention

The present invention relates to a computer-readable storage medium storing an image processing program.

2. Description of Related Art

There is known a copying machine configured to print copies of documents while displaying an image of each of the documents which have been read, on a screen one page by one page. In the copying machine, where a change of a printing condition is directed, a document page which follows a document page that is being currently printed is subjected to printing under the directed printing condition. That is, it is possible in the copying machine to change the printing condition during the copying operation.

SUMMARY

In the copying machine described above, however, the changed printing condition is reflected only on document pages to be printed after the printing condition has been changed, and the changed printing condition is not reflected on the already printed document pages and the document page that is being currently printed. Therefore, there may be a risk that good print results are not obtained due to a difference in appearance between the images printed before the printing condition is changed and the images after the printing condition is changed. Accordingly, where a user wants to change the printing condition in the midst of the copying operation after the copying operation has started, it is required for the user to initially suspend copying of the documents, to subsequently change the printing condition after again setting the already read documents, and to then restart copying from the first page of the documents. As a result, there may be problems of a large work load and an increased work time.

The present invention provides a computer-readable storage medium storing an image processing program which enables a reduction in a work load of a user and which suppresses an increase in a work time even where a reading condition is changed after a reading device has started to read documents.

More specifically, the present invention provides a computer-readable non-volatile storage medium storing an image processing program to be executed by a computer of an information processing device, wherein the program permits the computer to function as:
  a read-data receiving section configured to receive read data in page unit from a reading device configured to form, on the basis of a reading condition, the read data that corresponds to a document by reading the document;
  a read-data storage control section configured to store the read data received by the read-data receiving section, in a storage section;
  a change-command sending section configured to send, to the reading device, a change command of the reading condition based on a change direction of the reading condition where the change direction is received after the reading device has started to read plural pages of documents; and
  a converting section configured to convert, on the basis of the reading condition corresponding to the change command, read data stored in the storage section after the reading device has started to read the plural pages of documents, among the read data stored in the storage section by the read-data storage control section, wherein the read-data receiving section is configured to receive, from the reading device, read data formed on the basis of the reading condition corresponding to the change command after the change command has been sent by the change-command sending section, where the change command is sent by the change-command sending section.

It is noted that the present invention can be realized in various forms such as an image processing device, an image processing method, and a system including an image processing device and a reading device, in addition to the storage medium storing the image processing program.

BRIEF DESCRIPTION OF THE DRAWINGS

The above and other objects, features, advantages and technical and industrial significance of the present invention will be better understood by reading the following detailed description of embodiments of the invention, when considered in connection with the accompanying drawings, in which.

DETAILED DESCRIPTION OF THE EMBODIMENTS

Figure 1:
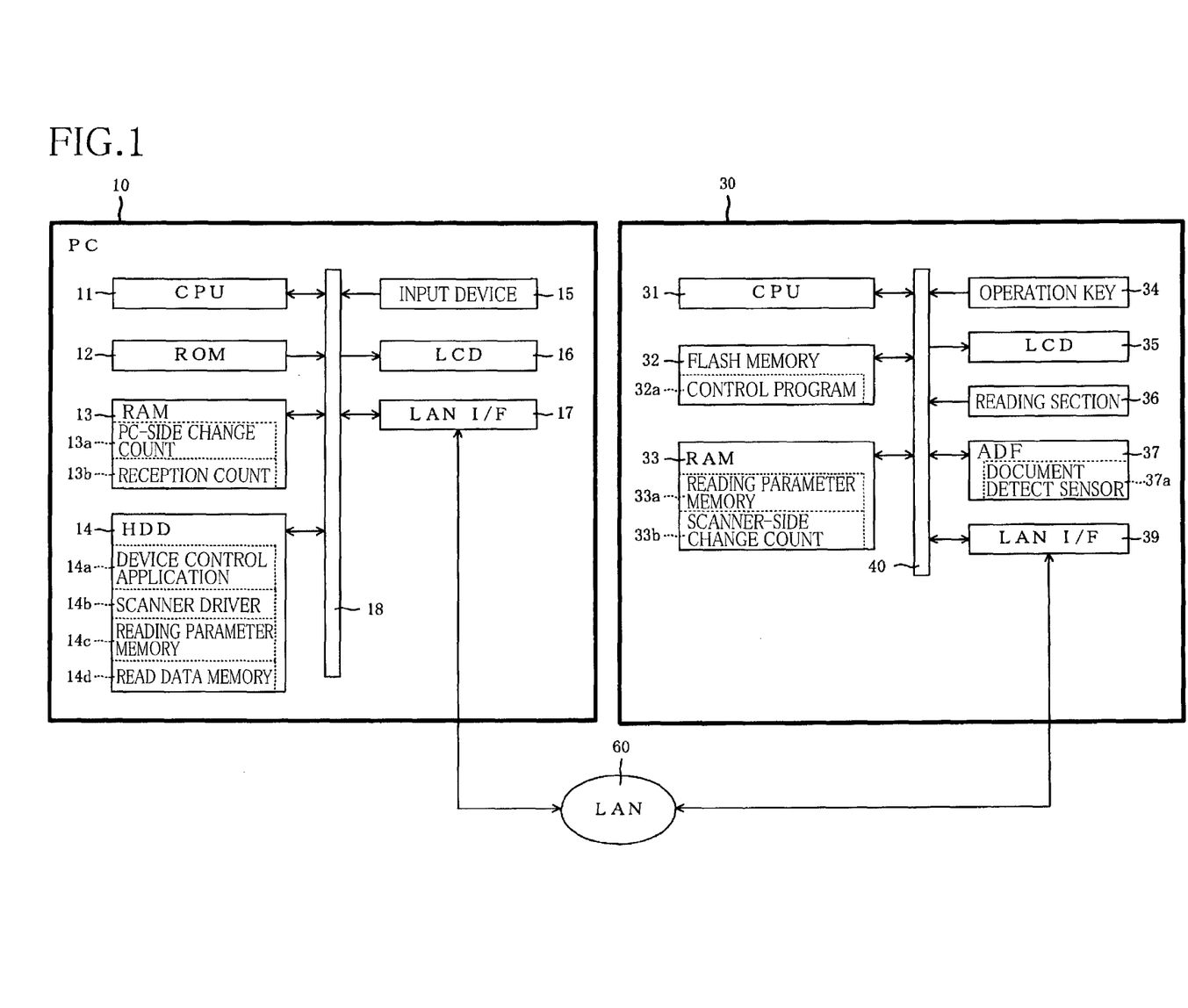
FIG. 1 is a block diagram showing an electric structure of a PC equipped with a device control application according to the present invention and an electric structure of a scanner.

There will be explained one embodiment referring to the drawings. FIG. 1 is a block diagram showing: an electric structure of a personal computer 10 (hereinafter referred to as "PC 10" where appropriate) equipped with a device control application 14a (hereinafter referred to as "application 14a") as one embodiment of an image processing program; and an electric structure of a scanner 30 configured to operate in accordance with directions from the PC 10.

The application 14a permits the PC 10 to send, to the scanner 30, a reading condition (hereinafter referred to as "reading parameter P" where appropriate) and a reading start direction. Where the scanner 30 receives, from the PC 10, the reading parameter P and the reading start direction, the scanner 30 forms or generates read data corresponding to a document on the basis of the reading parameter P and sends the read data to the PC 10. In particular, the application 14a is configured such that, even where the reading parameter P is changed after the scanner 30 has started to read documents, the application 14a eliminates a need of reading the documents again from the beginning, thereby reducing a work load of a user and suppressing an increase in a work time. The details will be explained.

The PC 10 mainly includes a CPU 11, a ROM 12, a RAM 13, a hard disk drive (HDD) 14, an input device 15, an LCD 16, a LAN interface (LAN I/F) 17 which are connected to each other through a bus line 18.

The CPU 11 controls various sections connected through the bus line 13 in accordance with programs stored in the ROM 12 and the HDD 14. The ROM 12 is a non-rewritable, non-volatile memory in which a control program for controlling an operation of the PC 10 is stored, for instance.

The RAM 13 is a rewritable, volatile memory and includes a PC-side change count 13a and a reception count 13b. The PC-side change count 13a is a memory area for storing a count or a number of times by which the user changes the reading parameter P in the PC 10 after the reading start direction has sent to the scanner 30, namely, a change count of the reading parameter P. The reception count 13b is a memory area for storing a number of document data received from the scanner 30 after the reading start direction for directing the scanner 30 to start reading of the documents has sent to the scanner 30. The document data will be explained with reference to FIG. 2B.

The HDD 14 is a rewritable, non-volatile storage device. The HDD 14 stores the application 14a and a scanner driver 14b and includes a reading parameter memory 14c and a read data memory 14d. The PC 10 executes document data reception processing (FIG. 3) which will be explained, according to the application 14a. The scanner driver 14b is a program for controlling the scanner 30 from the PC 10. The PC 10 sends various directions to the scanner 30 via the scanner driver 14b and receives data sent from the scanner 30. The reading parameter memory 14c is a memory area for storing the reading parameter P set by the user. The read data memory 14d is a memory area for storing read data extracted from the document data.

The input device 15 is constituted by a keyboard and a mouse for inputting directions from the user and various information into the PC 10. The LCD 16 is a liquid crystal display device. The LAN I/F 17 is a device for performing communication with other devices through a LAN 60.

The scanner 30 mainly includes a CPU 31, a flash memory 32, a RAM 33, operation keys 34, an LCD 35, a reading section 36, an ADF 37, and a LAN I/F 39 which are connected to each other through a bus line 40.

The CPU 31 controls various sections connected through the bus line 40 in accordance with programs stored in the flash memory 32. The flash memory 32 is a rewritable, non-volatile memory in which a control program 32a, etc., are stored. The CPU 31 executes reading processing (FIG. 5) which will be explained, according to the control program 32a.

The RAM 33 is a rewritable, volatile memory and includes a reading parameter memory 33a and a scanner-side change count 33b. The reading parameter memory 33a is a memory for storing the reading parameter P received from the PC 10. The scanner-side change count 33b is a memory area for storing a count or a number of times by which a change command of the reading parameter P has been received, namely, a reception count of the change command of the reading parameter P.

The operation keys 34 are hard keys through which directions from the user and various information are inputted into the scanner 30. The LCD 35 is a liquid crystal display device. The reading section 36 is configured to convert reflected light from a document into electric signals by a plurality of reading elements linearly arranged, so as to form read data corresponding to the document.

The ADF 37 is an automatic document feeding mechanism configured to feed the documents set on a document tray (not shown) to the reading section 36 one by one. A document detect sensor 37a is provided in the ADF 37 and is configured to detect whether or not any document is set on the document tray. The LAN I/F 39 connects, through the LAN 60, the scanner 30 and the PC 10 so as to enable communication therebetween.

Figure 2A:
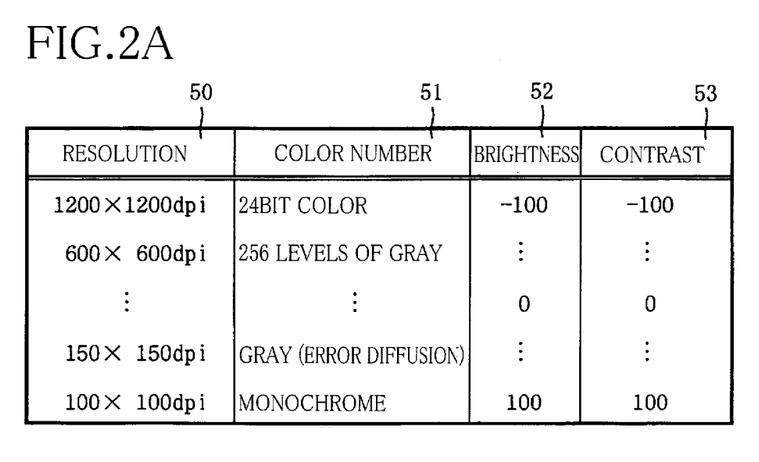
FIG. 2A is a view for explaining a concrete example of setting values included in a reading parameter and FIG. 2B is a schematic view showing a configuration of document data.

FIG. 2A is a view for explaining a concrete example of setting values included in the reading parameter P. The reading parameter P includes, each as a setting item, resolution 50, color number 51, brightness 52, and contrast 53. The reading parameter P includes, for each setting item, one of setting values shown in FIG. 2A as the setting value.

At the resolution 50, there is set resolution of read data to be formed by the scanner 30. In the present embodiment, the maximum resolution of the scanner 30 is 1200×1200 dpi. At the color number 51, there is set a value indicative of color number to be reproduced by each picture element of the read data. The scanner 30 performs, on the read data, monochrome processing or error diffusion processing on the basis of the setting value of the color number 51. At the brightness 52, there is set a value indicative of brightness of the read data. The scanner 30 performs, on the read data, gamma correction on the basis of the setting value of the brightness 52, thereby correcting the brightness of the read data. At the contrast 53, there is set a value indicative of contrast of the read data. The scanner 30 performs, on the read data, contrast correction on the basis of the setting value of the contrast 53, thereby correcting contrast of the read data.

Figure 2B:
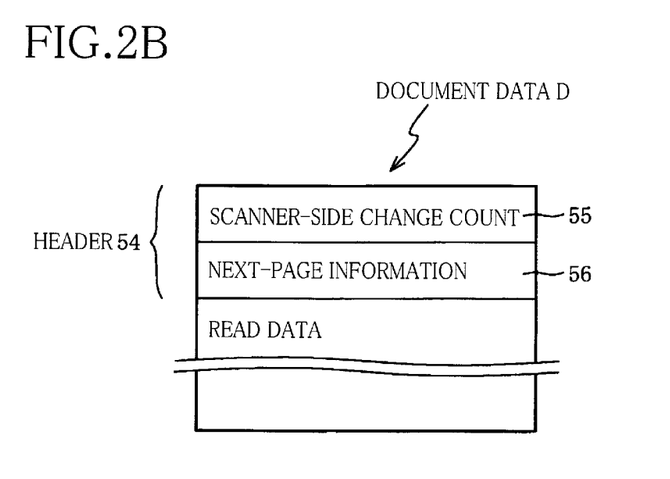

FIG. 2B is a view schematically showing a configuration of document data D. The document data D includes a header 54 and the read data. The read data is image data corresponding to an image of a one-page document read by the scanner 30.

The header 54 includes a scanner-side change count 55 corresponding to the read data in page unit and next-page information 56. The scanner-side change count 55 indicates a count or a number of times by which the scanner 30 receives the change command of the reading parameter P in a period after the scanner 30 has started to read the documents in response to reception of the reading start direction from the PC 10 and before read data corresponding to the scanner-side change count 55 (i.e., read data included in the document data D that includes the scanner-side change count 55 in question) is formed. More specifically, the scanner-side change count 55 indicates a count or a number of times by which the scanner 30 receives the change command of the reading parameter P in a period after starting of the documents by the scanner 30 and until a time point of starting to form read dada that is currently being formed by the scanner 30. For instance, where the scanner-side change count 55 indicates "0", it means that the scanner 30 never receives the change command of the reading parameter P after starting of reading of the documents.

The next-page information 56 is information indicative of whether or not next document data D is present. Every time when the scanner 30 reads a one-page document, the scanner 30 judges whether any document remains, namely, any document is set, on the document tray. Where the document remains on the document tray, the next-page information 56 indicative of presence of the next document data D is included in the header 54. Where no documents remain on the document tray, the next-page information 56 indicative of absence of the next document data ID is included in the header 54. The scanner 30 sends the document data D to the PC 10.

The PC 10 which has received the document data D judges, on the basis of the scanner-side change count 55, whether or not the read data included in the document data D in question is formed on the basis of the changed or updated reading parameter P, namely on the basis of the latest reading parameter P. The details will be later explained with reference to FIG. 3.

Figure 3:
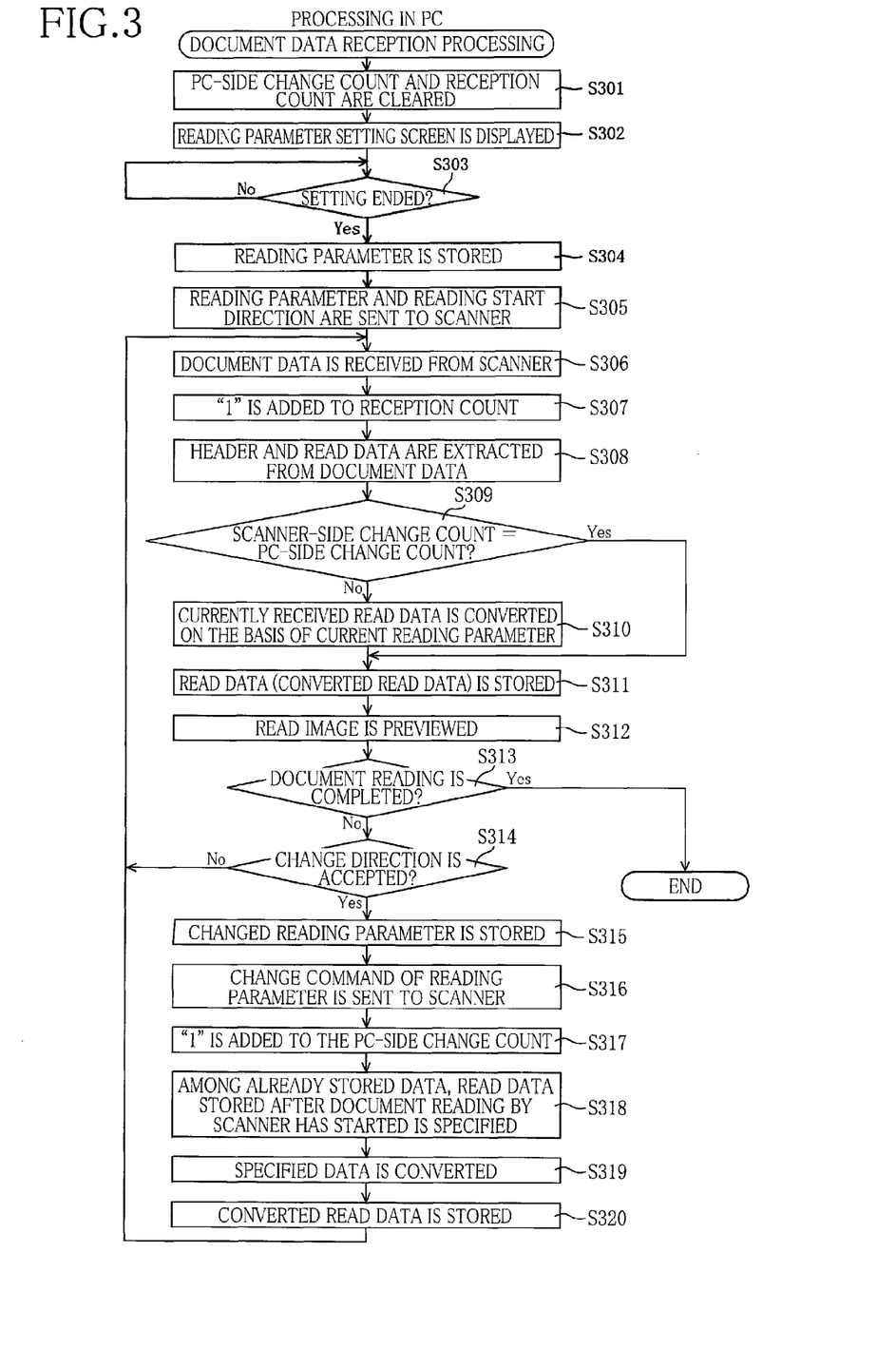
FIG. 3 is a flow chart showing document data reception processing executed in the PC.

FIG. 3 is a flow chart showing document data reception processing executed by the PC 10. This processing is for receiving the document data D from the scanner 30 and is executed when the user inputs, in the PC 10, a request for document reading (hereinafter referred to as "document reading request" where appropriate). In this respect, the user inputs the document reading request in the PC 10 after having set plural pages of documents on the document tray of the scanner 30.

Initially, the CPU 11 clears the PC-side change count 13*a* and the reception count 13*b* to 0 (S301) and controls the LCD 16 to display a reading parameter setting screen (S302).

Figure 4:
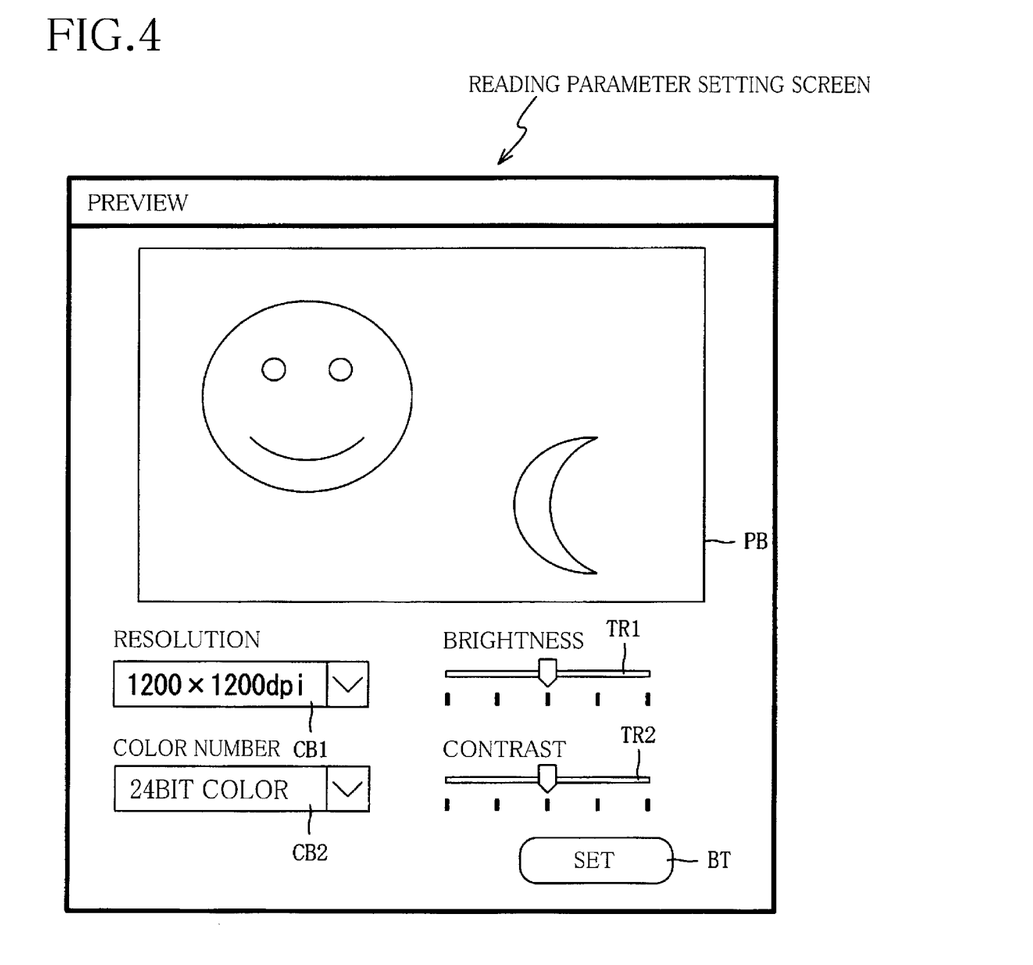
FIG. 4 is a view showing one example of a reading parameter setting screen displayed on an LCD of the PC.

FIG. 4 is a view showing one example of the reading parameter setting screen. The reading parameter setting screen allows the user to set the reading parameter P and includes an image display area PB, a resolution selecting box CB 1, a color number selecting box CB 2, a brightness setting bar TR 1, a contrast setting bar TR 2, and a setting button BT.

In the image display area PB, a read image based on the read data is displayed. Every time when the PC 10 receives the document data D from the scanner 30, the display in the image display area PB is updated on the basis of read data included in newly received document data D. The resolution selecting box CB 1 is for designating a setting value of the resolution 50. The color number selecting box CB 2 is for designating a setting value of the color number 51. At the brightness setting bar TR 1 and the contrast setting bar TR 2, setting values of the brightness 52 and the contrast 53 are designated, respectively. It is noted, however, that the contrast setting bar TR 2 is grayed out so as to be disabled, namely, the contrast 53 cannot be set, where monochrome is designated as the setting value of the color number 51.

The setting button BT is for establishing the reading parameter P designated by the user. When a cursor (not shown) is put on the setting button BT and a mouse-click is made, the setting of the reading parameter P is completed.

It is noted that the display of the reading parameter setting screen continues even after completion of setting of the reading parameter P. The change direction can be accepted through the reading parameter setting screen until the scanner 30 completes reading of all pages of the documents. A method of changing the reading parameter P will be explained.

Explanation will be made referring back again to FIG. 3. Where the setting button BT is not operated in the reading parameter setting screen (S303: No), the CPU 11 does not proceed to the next step. On the other hand, where setting of the reading parameter P is ended by operating the setting button BT (S303: Yes), the CPU 11 permits the reading parameter P designated in the reading parameter setting screen to be stored in the reading parameter memory 14*c* (S304). Further, the CPU 11 sends the reading parameter P and the reading start direction to the scanner 30 through the scanner driver 14*b* (S305).

Next, where the CPU 11 receives the document data D from the scanner 30 through the scanner driver 14*b* (S306), "1" is added to the reception count 13*b* (S307). That is, every time when the document data D for one page is received, the reception count 13*b* is counted up. In this arrangement, it is possible to store, in the reception count 13*b*, a number of the read data received by the PC 10 after the scanner 30 has started to read the plural pages of documents set on the document tray.

Subsequently, the CPU 11 extracts the header 54 and the read data from the received document data D (S306). The CPU 11 then judges whether or not the scanner-side change count 55 included in the header 54 and the PC-side change count 13*a* stored in the PC 10 coincide with each other (S309).

There will be first explained an instance in which the scanner-side change count 55 and the PC-side change count 13*a* coincide with each other. As described above, the scanner-side change count 55 indicates the count or the number of times by which the scanner 30 receives the change command before the scanner 30 starts to form the read data corresponding to the scanner-side change count 55 in question. The PC-side change count 13*a* indicates the count or the number of times by which the PC 10 accepts the change direction. Accordingly, where the scanner-side change count 55 and the PC-side change count 13*a* coincide with each other, it is possible to judge that the read data is formed on the basis of the changed reading parameter P, namely, on the basis of the latest reading parameter P.

In this instance (S309: Yes), the CPU 11 permits the read data extracted from the document data D, i.e., the read data formed on the basis of the changed reading parameter P, to be stored in the read data memory 14*d* (S311), and permits the read image based on the read data to be previewed on the image display area PB of the reading parameter setting screen (FIG. 4) (S312).

Where the next-page information 56 included in the header 54 indicates presence of the next document data D, in other words, the document reading is not completed (S313: No) and where the reading parameter P is not changed (S314: No), the CPU 11 returns to S306 to repeat the processing. That is, every time when the document data D is received, the CPU 11 permits the read data extracted from the document data D to be stored in the read data memory 14*d* and to permit the read image based on the read data to be previewed in the image display area PB.

There will be explained an instance in which the change direction of the reading parameter P is accepted in the reading parameter setting screen during repetition of the processing described above. In the present embodiment, the change direction means that the user changes the setting values of the reading parameter setting screen and thereafter operates the setting button BT to establish the change.

Where the change direction of the reading parameter P is accepted (S314: Yes), the CPU 11 permits the reading parameter P based on the change direction to be stored in the reading parameter memory 14*c* (S315). That is, the reading parameter memory 14*c* is overwritten with the latest reading parameter P designated by the user in the reading parameter setting screen Then the CPU 11 sends the change command that includes the changed reading parameter P to the scanner 30 through the scanner driver 14*b* (S316). In the meantime, when the scanner 30 receives the change command, the scanner 30 thereafter forms the read data on the basis of the reading parameter P corresponding to the change command. Accordingly, the PC 10 can receive, from the scanner 30, the read data formed on the basis of the changed reading parameter P.

Subsequently, the CPU 11 adds "1" to the PC-side change count 13*a* (S317). In other words, the CPU 11 permits the count or the number of times by which the change direction of the reading parameter P is accepted in the PC 10 after the scanner 30 has started to read the plural pages of documents, to be stored in the PC-side change count 13a.

Next, on the basis of the reception count 13b, the CPU 11 specifies or identifies, among the read data stored in the read data memory 14d, the read data which is stored in the read data memory 14d after the scanner 30 has started to read the plural pages of documents and which has been read by the reading section 36 before the change command is reflected as the reading parameter P, namely, the read data formed on the basis of the reading parameter P before changed, i.e., one example of conversion-necessary read data (S318). More specifically, among the read data stored in the read data memory 14d, the CPU 11 specifies the read data by a number corresponding to the number stored in the reception count 13b, in the order from the latest stored read data. Subsequently, the CPU 11 converts the specified read data on the basis of the current reading parameter P, namely, the changed reading parameter P, stored in the reading parameter memory 14c (S319). Thereafter, the converted read data the read data after conversion) is stored in the read data memory 14d, so as to replace the read data stored in the read data memory 14d and formed on the basis of the reading parameter P before changed (S320).

Thus, the read data already received from the scanner 30 is subjected to conversion processing in the PC 10, thereby forming the read data corresponding to the changed reading parameter P. In this respect, specific examples of the conversion processing include various image processing such as thinning processing for converting the resolution, monochrome processing and error diffusion processing for converting the color number, gamma correction processing for adjusting the brightness, and contrast correction processing for adjusting the contrast. Accordingly, it is possible to convert the read data received by the PC 10 in a period after the scanner 30 has started to read the documents and before the reading parameter P is changed, into the read data corresponding to the changed reading parameter P. Thereafter, the CPU 11 returns to S306 to repeat the processing.

It is noted that, in S318, the read data stored after the scanner 30 has started to read the plural pages of documents is specified on the basis of the reception count 13b. Accordingly, even where previously received read data remains in the read data memory 14d, it is possible to appropriately specify the read data received in the current execution of the document data reception processing, namely, the read data to be converted.

Here, there may be some cases in which the read data corresponding to the changed reading parameter P cannot be formed in the PC 10, depending upon change contents of the reading parameter P. Where the resolution 50 before changed is "600×600 dpi", for instance, the PC 10 stores, as the read data, data of 600×600 dpi. Accordingly, in an instance where the resolution 50 of the reading parameter P is changed to "1200×1200 dpi", it is impossible to form read data corresponding to the changed resolution 50 even if the already stored read data is subjected to image processing. On the contrary, in an instance where the resolution 50 is changed to "150×150 dpi", it is possible to form read data corresponding to the changed resolution 50 by performing thinning processing on the already stored read data.

Accordingly in the document data reception processing (FIG. 3) the present embodiment, in an instance where read data corresponding to a second reading parameter P is formable by converting read data formed on the basis of a first reading parameter P, a change from the first reading parameter P to the second reading parameter P is accepted. Further, in an instance where the read data corresponding to the second reading parameter P is non-formable from the read data formed on the basis of the first reading parameter P, the change from the first reading parameter P to the second reading parameter P is not accepted.

More specifically, in accepting the change direction of the reading parameter P in the reading parameter setting screen (FIG. 4), the setting value(s) that can be changed in view of a relationship between the currently set reading parameter P and the reading parameter P to be changed is rendered designatable while the setting value(s) that cannot be changed is rendered undesignatable by being grayed out. Where a certain setting value is currently designated for the resolution 50, for instance, the setting value indicative of resolution which is higher than the resolution corresponding to the certain setting value is grayed out and is arranged so as not to be designated. On the contrary, the setting value indicative of resolution which is equal to or lower than the resolution corresponding to the certain setting value is arranged so as to be designatable. According to the arrangement, it is possible to avoid inappropriate inputting of the change direction, ensuring the user of good operability.

Here, there may be a possibility that a time lag exists in a period, after the change command of the reading parameter P has been sent from the PC 10 to the scanner 30 and before the change command is reflected in the scanner 30. In other words, there may be a case in which, although the changed reading parameter P had been sent from the PC 10 to the scanner 30, the scanner 30 already started to form the read data before reflecting the change of the reading parameter P. In such a case, there may be a possibility that the PC 10 receives the read data formed on the basis of the reading parameter P before changed.

In the document data reception processing according to the present embodiment, therefore, where the scanner-side change count 55 included in the header 54 of the document data D and the PC-side change count 13a do not coincide with each other, more specifically, where the count or the number of times by which the change direction is accepted in the PC 10 is larger than the count or the number of times by which the scanner 30 receives the change command before the scanner 30 starts to form the read data, it is judged that the read data in question is the read data formed on the basis of the reading parameter P before changed. In this instance (S309: No), the CPU 11 converts the read data of the currently received document data D on the basis of the current reading parameter P that is currently stored in the reading parameter memory 14c (i.e., the changed reading parameter P) (S310). As a result, the read data formed on the basis of the reading parameter P before changed is converted into the read data on the basis of the reading parameter P after changed. Thereafter, the CPU 11 permits the converted read data to be stored in the read data memory 14d and proceeds to S312.

Accordingly even where there is a time lag in a period after the change command has been sent from the PC 10 to the scanner 30 and before the change command is reflected in the scanner 30, the PC 10 can obtain appropriate read data corresponding to the changed reading parameter P.

Subsequently, the CPU 11 permits the read image based on the read data stored in the read data memory 14d in S311 to be previewed in the image display area PB (S312). That is, where it is judged in S309 that the read data is the read data formed on the basis of the changed reading parameter P (S309: Yes), the CPU 11 permits the read image based on the read data in question to be displayed. On the other hand, where it is judged in S309 that the read data is the read data formed on the basis of the reading parameter P before changed (S309: No), the CPU 11 permits the read image based on the read data converted in S310.

According to the arrangement, irrespective of whether or not the read data that the PC 10 receives from the scanner 30 corresponds to the changed reading parameter P, the read image based on the read data is displayed as the read image corresponding to the changed reading parameter P, every time when the PC 10 receives the read data. Therefore, the arrangement enables the user to visually check how the change of the reading parameter P influences the read image, whereby the user can easily judge whether further change of the reading parameter P is necessary or not.

Where the reading of the documents by the scanner 30 is completed during repetition of the processing described above, namely, where the next-page information 56 included in the header 54 of the currently received document data D indicates absence of the next document data D (S313: Yes), the CPU 11 ends the present processing.

According to the document data reception processing described above, even where the reading parameter P is changed after the scanner 30 has started to read the documents, it is not necessary to again read the documents from the beginning and it is possible to reflect the changed reading parameter on the read data which have already been read. Therefore, the work load of the user can be reduced and the work time can be prevented from being increased. In other words, when the user changes the reading parameter P in the midst of the reading of the documents after the documents have been set in the scanner 30 and the scanner 30 has started to read the documents, it is possible to apply the changed reading parameter P to the read data of all pages of the documents. Accordingly, the arrangement eliminates a cumbersome work of again setting the documents in the scanner 30 and permitting the scanner 30 to again read the documents from the first page.

Where the reading parameter P is changed in the midst of the reading of the documents, the read data to be formed after the reading parameter P has been changed is formed by the scanner 30 so as to correspond to the changed reading parameter P. At the same time, in the PC 10, the processing of converting the already formed read data on the basis of the changed reading parameter P is executed. Accordingly, the arrangement reduces a processing time required for obtaining the read data of all pages of the documents corresponding to the changed reading parameter P, as compared with an arrangement in which the conversion processing is performed collectively on the read data after completion of the reading of the documents by the scanner 30.

According to the document data reception processing described above, it is possible to appropriately judge whether the read data is formed on the basis of the reading parameter P that corresponds to the change command, on the basis of the scanner-side change count 55 included in the document data D and the PC-side change count 13$a$ stored in the PC 10. In this respect, it is enough for the scanner-side change count 55 to simply indicate the count or the number of times by which the scanner 30 receives the change command, so that the data amount of the scanner-side change count 55 can be sufficiently made small. Hence, even where there is a limit in the data amount storable in the header 54 in terms of specifications of the scanner 30 or the document data D, it is relatively easy to store the scanner-side change count 55 in the header 54.

Figure 5:
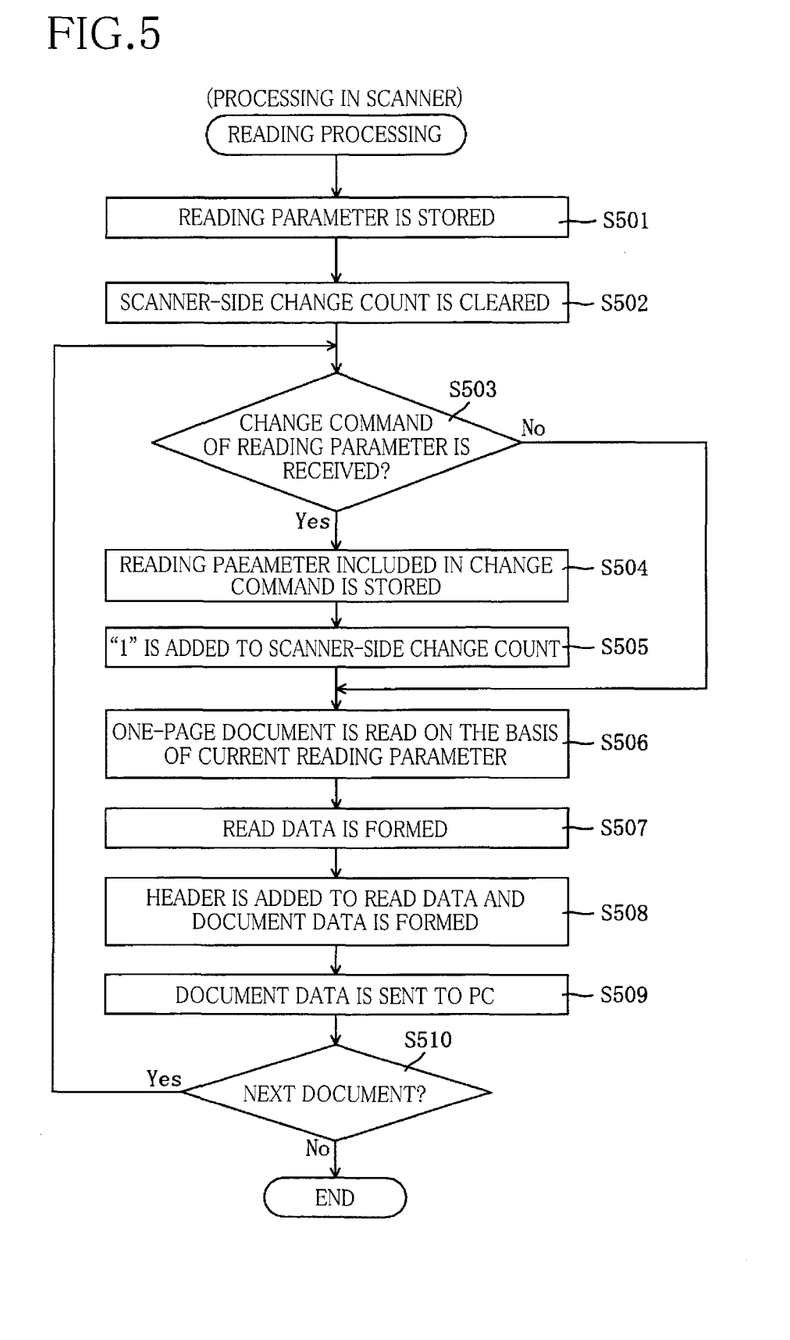
FIG. 5 is a flow chart showing reading processing executed in the scanner.

FIG. 5 is a flow chart showing reading processing executed by the scanner 30. This processing is for forming the document data D and sending the formed document data D to the PC 10 and is executed when the reading start direction and the reading parameter P are received from the PC 10.

Initially, the CPU 31 permits the received reading parameter P to be stored in the reading parameter memory 33$a$ (S501) and dears the scanner-side change count 33$b$ to 0 (S502). Subsequently, where the change command of the reading parameter P is received (S503: Yes), the CPU 31 extracts the reading parameter P from the change command and permits the extracted reading parameter P to be stored in the reading parameter memory 33$a$ (S504). In other words, the reading parameter memory 33$a$ is overwritten with the latest reading parameter P extracted from the change command. Then the CPU 11 adds "1" to the scanner-side change count 33$b$ (S505). On the other hand, where the change command of the reading parameter P is not received (S503: No), the CPU 31 skips S504 and S505.

Next, the CPU 31 controls the reading section 36 to read a document (a one-page document) among the plural-page documents set on the document tray on the basis of the current reading parameter P stored in the reading parameter memory 33$a$ while controlling the ADF 37 to convey the one-page document (S506), thereby forming the read data (S507). Subsequently, the CPU 31 adds the header 54 to the read data, thereby forming the document data D (S508). More specifically the value of the scanner-side change count 33$h$ is included in the header 54 of the document data D as the scanner-side change count 55. Further, the CPU 31 judges whether or not any document remains on the document tray, on the basis of the output value of the document detect sensor 37$a$. Where the document(s) remains on the document tray, the next-page information 56 which indicates presence of the next document data D is included in the header 54. On the other hand, no documents remain on the document tray, the next-page information 56 which indicates absence of the next document data D is included in the header 54.

Subsequently; the CPU 31 sends the document data D to the PC 10 (S509) and returns back to the processing of S503 to repeat reading of the documents where the document(s) remains on the document tray (S510: Yes). On the other hand, where no documents to read exist (S510: No), the CPU 31 ends the present reading processing.

While the embodiment has been illustrated, it is to be understood the present invention is not limited to the details of the illustrated embodiment, but may be embodied with various other changes and modifications which may occur to those skilled in the art, without departing from the scope of the invention defined in the attached claims.

For instance, the concrete numerical values in the illustrated embodiment are examples. It is possible to employ other numerical values.

In the illustrated embodiment, the PC 10 is one example of the information processing device and the scanner 30 is one example of the reading device. However, a portable terminal, a composite machine or the like may be one example of the information processing device or the reading device.

Further, it is possible to suitably change the sorts of the setting items and the setting values included in the reading parameter P. For instance, the reading parameter P may include on/off of execution of red-eye removal, on/off of execution of show-through correction, and a length size and a width size of a reading range of the document. In this instance, a change from "off" to "on" is acceptable while a change from "on" to "off" is unacceptable for the red-eye removal and the show-through correction. For a change in the longitudinal size and the width size of the reading range, only a change to narrow the range is acceptable.

In the illustrated embodiment, the setting value that cannot be changed is grayed out for disabling acceptance of a change to the setting value. Instead, the setting value that cannot be changed may be arranged so as to be hidden (so as not to be displayed) for disabling acceptance of a change to the setting value. Where all of prepared setting values are normally displayed irrespective of whether the setting values are changeable or not, an error notification may be provided when the user designates the setting value that cannot be changed, for thereby disabling acceptance of the designation by the user.

Figure 6:
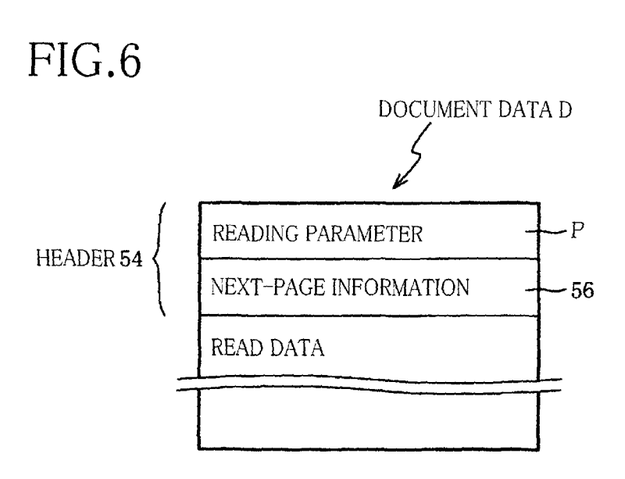
FIG. 6 is a schematic view showing another example of a configuration of document data.

In the illustrated embodiment, the scanner-side change count 55 which indicates the count or the number of times by which the scanner 30 receives the change command before the scanner 30 starts to form the read data is included in the header 54 of the read data. However, in place of the scanner-side change count 55, the reading parameter P used for formation of the read data may be associated with or related to the read data in page unit (by being included in the header, for instance) and may be sent from the scanner 30 to the PC 10, as shown in FIG. 6.

Figure 7:
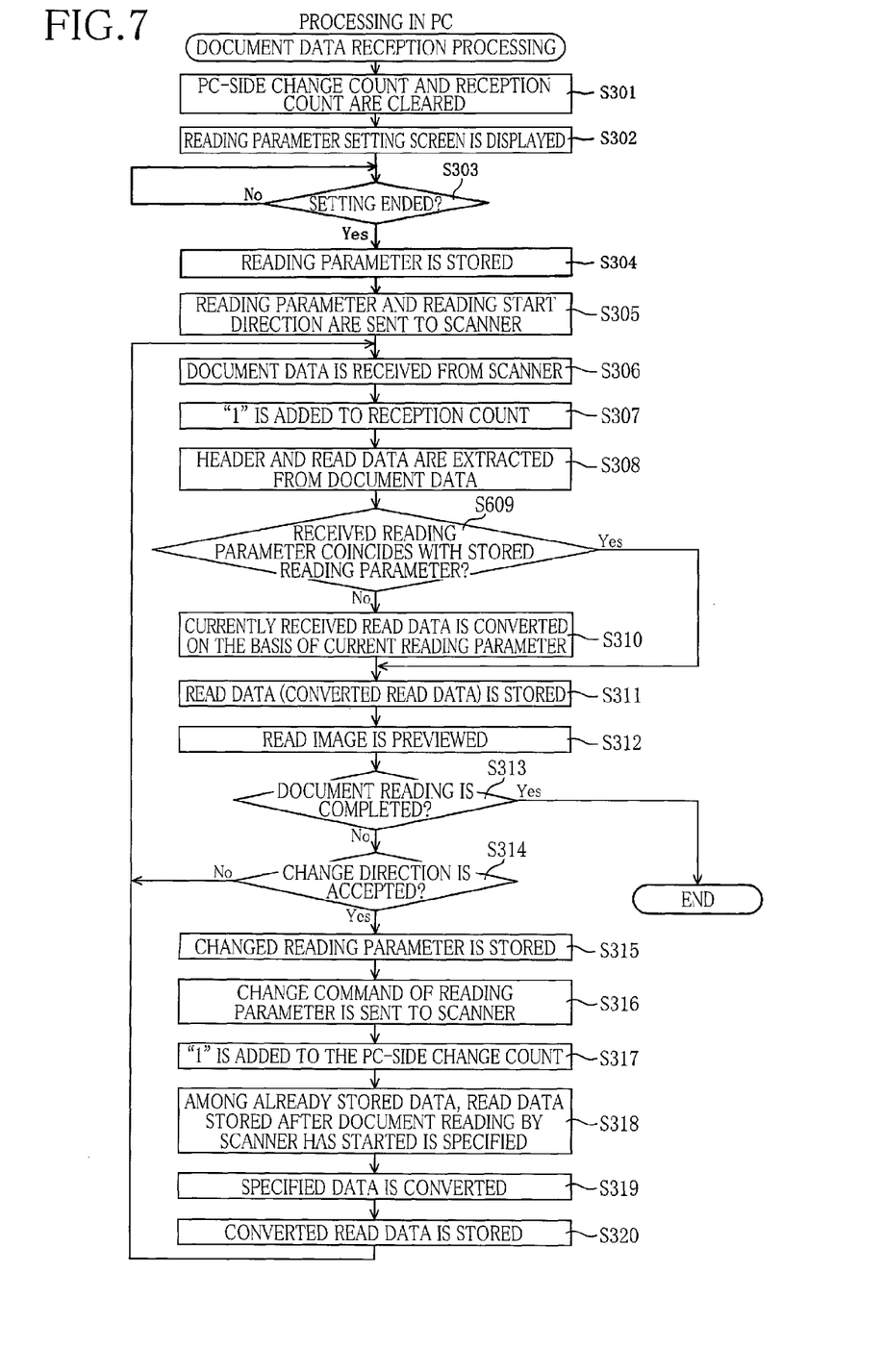
FIG. 7 is a flow chart, showing document data reception processing executed in the PC according to another embodiment.

FIG. 7 shows a flow chart indicating document data reception processing executed by the PC 10 according to such an arrangement in which the reading parameter P used for formation of the read data is associated with or related to the read data in page unit. The same step numbers as in the flow chart of FIG. 3 are assigned to steps of the flow chart of FIG. 7 in which the same processing in the corresponding steps of the flow chart of FIG. 3 is executed, and a detailed explanation of which is dispensed with. The PC 10 extracts the reading parameter P used for formation of the read data from the document data and receives the extracted reading parameter P as attachment information corresponding to the read data in question (S308). Subsequently, where the reading parameter P received from the scanner 30 coincides with the reading parameter P stored in the reading parameter memory 14*c* (S609: Yes), the PC 10 judges that the read data is the read data formed on the basis of the reading parameter P corresponding to the change command and permits the read data extracted from the received document data to be stored in the read data memory 14*d* (S311). On the other hand, where the reading parameter P received, from the scanner 30 does not coincide with the reading parameter P stored in the reading parameter memory 14*c* (S609: No), the PC 10 judges that the read data is the read data formed on the basis of the reading parameter P before changed. In this instance, S310 is implemented and the read data which has been converted is stored in the read data memory 14*d* (S311). As in the illustrated embodiment, it is possible in this arrangement to appropriately judge whether or not the read data received from the scanner 30 is the read data formed on the basis of the reading parameter P corresponding to the change command.

In the illustrated embodiment, when the PC 10 sends the reading start direction to the scanner 30, the scanner 30 sequentially reads the documents set on the document tray until no documents exist on the document tray. Instead, the PC 10 may be configured to send, to the scanner 30, the reading start direction for every one page. That is, when the reading start direction is sent from the PC 10 to the scanner 30, the scanner 30 may read a one-page document and send to the read data of the one-page document to the PC 10. The PC 10 may be configured to send, to the scanner 30, the reading start direction to direct the scanner 30 to read the next one-page document, on condition that the read data of the above-indicated one-page document has been received.

In the arrangement described just above, the PC 10 can judge whether the read data received from the scanner 30 is based on the reading parameter P before changed or is based on the current reading parameter P (i.e., the reading parameter P after changed), in the following manner, for instance.

Initially, the PC 10 counts a number of times by which the PC 10 has sent the reading start direction to the scanner 30. Where the PC 10 sends the change command after an n-th time reading start direction has been sent, the PC 10 stores "n" (n: an integer not smaller than 1). When the PC 10 receives the read data from the scanner 30, the PC 10 refers to the value of the reception count 13*b*, whereby the PC 10 judges on the basis of what number reading start direction, the read data is formed. For the read data formed on the basis of the reading start direction up to the n-th time, the PC 10 judges that the read data was formed on the basis of the reading parameter P before changed, and the PC 10 converts the read data on the basis of the reading parameter P after changed. On the other hand, for the read data formed on the basis of the reading start direction after (n+1) times, the PC 10 judges that the read data was formed on the reading parameter P after changed, and the PC 10 does not convert the read data.

According to the arrangement described just above, it is possible to judge whether or not the read data was formed on the basis of the reading parameter P after changed, utilizing the values (i.e., "n" and the reception count 13*b*) stored on the side of the PC 10. Therefore, it is possible to eliminate, on the side of the scanner 30, the processing in which attachment information such as the scanner-side change count 55 is associated with or related to the read data.

In the illustrated embodiment, where the scanner 30 receives the change command of the reading parameter P from the PC 10 (S503: Yes), the CPU 31 continues execution of the reading processing, on the basis of the reading parameter P before changed, with respect to a document (a document page) which is being subjected to the reading processing at a tune when the change command is received. Further, the PC 10 (the CPU 11) converts the read data of this document, namely the read data formed on the basis of the reading parameter P before changed, into the read data corresponding to the reading parameter after changed (i.e., the changed reading parameter) (S310). Instead, for the document which is being subjected to the reading processing at a time when the change command is received, the CPU 31 may form the read data on the basis of a new reading parameter (i.e., the reading parameter after changed) that was stored in the reading parameter memory 33*a* in S504, without suspending the reading processing by the reading section 36 with respect to the document in question in S506. Alternatively, the CPU 31 may suspend the reading processing by the reading section 36 with respect to the document in question in S506 and may thereafter form the read data on the basis of a new reading parameter stored in the reading parameter memory 33*a* in S504. In the latter case, in the read data of the document which is being subjected to the reading processing at a time when the change command is received, the read data based on the reading parameter before changed and the read data based on the reading parameter after changed are mixed. In this instance, by converting, in S310, a portion of the read data of the document in question, which portion is based on the reading parameter before changed, into the read data corresponding to the reading parameter after changed, it is possible to obtain the read data corresponding to the reading parameter after changed in a shorter time.

In the illustrated embodiment, where the scanner 30 receives the change command of the reading parameter P from the PC 10 (S503: Yes), the CPU 31 forms the read data (S506) sequentially from the document that is to be first read by the reading section 36 after reception of the change command, namely, sequentially from the document that is the first or next page counted from the document which was being subjected to the reading processing, on the basis of the reading parameter P included in the received change command. Instead, the CPU 31 may be configured to form the read data in S506 sequentially from a document that is the second page counted from the document which was being subjected to the reading processing, among the documents to be read by the reading section 36 after reception of the change command, on the basis of the reading parameter included in the received change command.

In the illustrated embodiment, every time when the reading parameter P is changed in the PC 10, the conversion processing (S319) is executed for converting the read data stored in the read data memory 14*d*, on the basis of the changed reading parameter P. However, the conversion of the read data stored in the read data memory 14*d* may be executed collectively where the change direction of the reading parameter P is not accepted for a certain time period or may be executed collectively after all of the documents have been read. In such arrangements, the number of times of execution of the conversion, processing is suppressed, thereby reducing the load in the PC 10.

An estimated value of the processing time required for forming the read data may be stored in advance for each of combinations of the setting values included in the reading parameter P and may be displayed on the LCD 16. For instance, every time when the user designates the setting values in the reading parameter setting screen, the estimated value of the processing time corresponding to the combination of the designated setting values may be displayed, whereby the user can change the reading parameter P after having acknowledged to what extent the change of the reading parameter P influences the processing tune, so as to ensure enhanced convenience.

In the illustrated embodiment, the processing (S310) for converting the latest received read data, namely the read data not yet stored in the read data memory 14*d*, and the processing (S319) for converting the read data stored in the read data memory 14*d* are executed independently of each other. Instead, S319 may be eliminated, and the latest received read data and the read data already stored in the read data memory 14*d* before reception of the above-indicated latest received read data may be converted collectively where it is judged that the latest received read data is formed on the basis of the reading parameter P before changed (S309: No). The arrangement reduces the number of times of execution of the conversion processing, thereby reducing the load in the PC 10.

In the illustrated embodiment, the reading start direction is arranged to be sent from the PC 10 to the scanner 30. The present invention may be applicable to an instance in which the scanner 30 starts to read the plural pages of documents on the basis of the reading start direction inputted through the operation key 34 of the scanner 30.

In the illustrated embodiment, the scanner-side change count 55 is configured to indicate the count or the number of times by which the scanner 30 receives the change command before the scanner 30 starts to form the read data corresponding to the scanner-side change count 55. Instead, the scanner-side change count 55 may be configured to indicate a count or a number of times by which the scanner 30 receives the change command until the scanner 30 completes formation of the read data corresponding to the scanner-side change count 55. In this arrangement, the reading processing (FIG. 5) executed by the scanner 30 may be modified as follows. Initially, in the scanner 30, the CPU 31 forms the read data and judges whether or not the change command of the reading parameter P is received from the PC 10, immediately before completion of the formation of the read data. Where it is judged that the change command of the reading parameter P is received, the CPU 31 performs conversion processing corresponding to the change command with respect to the read data that is being currently formed. Where any further change command of the reading parameter P is not received after a time point of the judgment that has made immediately before completion of the formation of the read data, the formation of the read data is completed. Subsequently, the scanner-side change count 55 which indicates a count or a number of times by which the change command is received until completion of the formation of the read data is included in the header 54 of the read data in question and is sent to the PC 10 as the document data D. This arrangement also ensures advantages similar to those in the illustrated embodiment.

In other words, "the change-command reception-count information indicative of a count by which the change command is received in the reading device before the read data is formed" may be a count or a number of times by which the change command is received before the formation of the read data is started or may be a count or a number of times by which the change command is received before the formation of the read data is completed.

In the illustrated embodiment, every time when a one-page document is read in the scanner 30, the next-page information 56 indicative of presence or absence of the next document is included in the header 54 of the document data D by the scanner 30. Instead, the next-page information 56 may be arranged so as to be included in the header 54 where the next document is present and so as not to be included in the header 54 where the next document is absent. In this instance, it is judged in the PC 10 whether the reading of the documents is completed or not, on the basis of presence or absence of the next-page information 56 in the header 54 (S313 in FIG. 3).

In the document data reception processing (FIG. 3) of the illustrated embodiment, after display of the reading parameter setting screen has started (S302), the screen is continued to be displayed until all of the documents set in the scanner 30 are read. However, the reading parameter setting screen may be once cleared or turned off, and thereafter the reading parameter setting screen may be again displayed, every time when the document data D is received from the scanner 30. Alternatively, the reading parameter setting screen that is already being displayed may be kept as it is, and every time when the document data D is received from the scanner 30, another reading parameter setting screen corresponding to the received document data D may be newly displayed.

In the illustrated embodiment, where the count or the number of times by which the change direction is accepted in the PC 10 is larger than the count or the number of times by which the change command is received before the scanner 30 starts to form the read data (S309: No), the CPU 11 converts the read data of the currently received document data D (S310) on the basis of the current reading parameter P stored in the reading parameter memory 14*c* the changed reading parameter P) and permits the read image corresponding to the read data based on the changed reading parameter P to be previewed in the image display area PB (S312). However, S309 and S310 are not essential steps. That is, even if the read data of the currently received document data D is based on the reading parameter before changed, the CPU 11 of the PC 10 may be configured to permit the read image corresponding to the read data based on the reading parameter before changed to be previewed. The user can confirm that a desired document has been read owing to the preview of the read image corresponding to the read data based on the reading parameter before changed.

In the illustrated embodiment, in accepting the change direction of the reading parameter P in the reading parameter setting screen, the setting values which would result in an increase in the resolution and the color number as compared with the setting values of the current reading parameter P are grayed out so as not to be accepted. In addition, the setting values which are the same as the setting values of the current reading parameter P may be grayed out or hidden (not displayed), so as not to be accepted. In this arrangement, it is possible to avoid an unnecessary work that the user again designates the setting values which are the same as the setting values of the current reading parameter P.

What is claimed is:

1. A data reading system equipped with: an information processing device capable of performing image processing; a reading device configured to enable transmission and reception of information with the information processing device and to form read data by reading a document under a reading parameter sent from the information processing device, so as to send the read data to the information processing device,
wherein the information processing device comprises:
a read command sending section configured to send, to the reading device, (a) a first reading parameter and (b) a reading start command which is a reading command for reading all documents of a particular set of documents and which causes the reading device to start to read the particular set of documents under the first reading parameter, the first reading parameter including at least one of resolution, brightness and contrast;
wherein the reading device comprises:
a first reading section configured to read the particular set of documents under the first reading parameter in page unit in response to receipt of the first reading parameter and the reading-command:
a first indication-adding section configured to add a first indication to the read data read under the first reading parameter, the first indication indicating that the read data is read under the first reading parameter; and
a first read-data sending section configured to send, in page unit, the read data and the added first indication to the information processing apparatus;
wherein the information processing apparatus comprises:
a first read-data receiving section configured to receive the read data and the added first indication in page unit from the reading device;
a change command sending section configured to send, while the reading device is reading the particular set of documents under the first reading parameter, (a) a second reading parameter that is different from the first reading parameter and (b) a change command which causes the reading device to read at least one second document of the particular set of documents under the second reading parameter to the reading device, the at least one second document following at least one first document of the particular set of documents in order in the particular set of documents, the at least one first document being read under the first reading parameter, the second reading parameter including at least one of the resolution, the brightness and the contrast;
wherein the reading device comprises:
a second reading section configured to read the at least one of the particular set of documents under the second reading parameter in page unit in response to receipt of the second reading parameter and the change command;
a second indication-adding section configured to, in response to the receipt of the change command, add a second indication to the read data read under the second reading parameter, the second indication indicating that the read data is read under the second reading parameter; and
a second read-data sending section configured to send in page unit, the read data and the added second indication to the information processing apparatus;
wherein the information processing apparatus comprises:
a second read-data receiving section configured to receive the read data and the added second indication in page unit from the reading device;
a converting section configured to execute an image conversion processing in which read data of the at least one first document of the particular set of documents with the added first indication is converted, on the basis of the second reading parameter corresponding to the change command, and
a read data storage control section is configured to store, in a storage, the converted data converted by the converting section and the read data which is received by the second read data receiving section read data of the particular set of documents.

2. The reading system according to claim 1, wherein the information processing device further comprises a display control section configured to display, in a display section, an image based on the read data stored in the storage or the converted data, stored in the storage, converted by the converting section.

3. The reading system according to claim 1, wherein the information processing device further comprises a change direction accepting section configured to accept a change direction that is a change from the first reading parameter to the second reading parameter, when read data corresponding to the second reading parameter is feasible by conversion of read data formed on the basis of the first reading parameter by the conversion section, and configured not to accept the change direction that is a change from the first reading parameter to the second reading parameter is not feasible from the read data formed on the basis of the first reading parameter, and
wherein the change command sending section is configured to send, to the reading device, the change command based on the change direction, when the change direction is accepted by the change direction accepting section.

4. The reading system according to claim 1, wherein the information processing device further comprises: a data number information storage control section configured to store, in the storage, data number information corresponding to a number of the read data received by the first read data receiving section after the reading device has started to read the particular set of documents; and
a specifying section configured to specify the read data read under the first reading parameter, in the storage, on the basis of the data number information stored in the storage by the data number information storage control section, and
wherein the converting section is configured to convert the read data specified by the specifying section.

* * * * *